United States Patent [19]

Ruben et al.

[11] Patent Number: 4,855,946

[45] Date of Patent: Aug. 8, 1989

[54] REDUCED SIZE PHASE-TO-AMPLITUDE CONVERTER IN A NUMERICALLY CONTROLLED OSCILLATOR

[75] Inventors: Paul W. Ruben; Eugene F. Heimbecher, II; David L. Dilley, all of Chandler, Ariz.

[73] Assignee: Motorola, Inc., Schaumburg, Ill.

[21] Appl. No.: 111,224

[22] Filed: Oct. 22, 1987

[51] Int. Cl.$^4$ .............................................. G06F 1/02
[52] U.S. Cl. ................................................ 364/721
[58] Field of Search ............................... 364/721, 718

[56] References Cited

U.S. PATENT DOCUMENTS 4,482,974  11/1984  Kovalick ........................... 364/721
4,486,846  12/1984  McCallister et al. ............. 364/721
4,536,853  8/1986   Kawamoto et al. ............... 364/718
4,583,188  4/1986   Cann et al. ....................... 364/608

Primary Examiner—Gary V. Harkcom
Assistant Examiner—Dale M. Shaw
Attorney, Agent, or Firm—Frank J. Bogacz; Maurice J. Jones

[57] ABSTRACT

A numerically controlled oscillator employing a ½ least significant bit (LSB) phase offset and a negative ½ LSB amplitude offset of data samples in memory devices for improved quadrant replication. Also, fine values are added or subtracted to the coarse values further reducing the amount of data needed in memory and further reducing the size of the phase-to-amplitude converter.

6 Claims, 2 Drawing Sheets

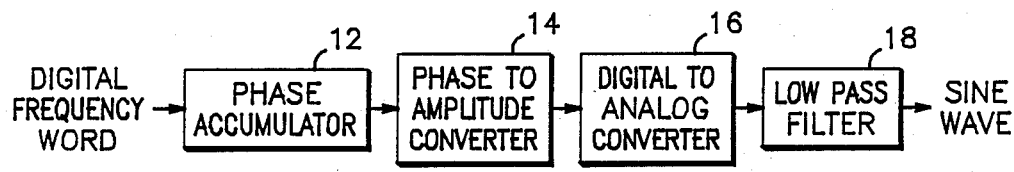
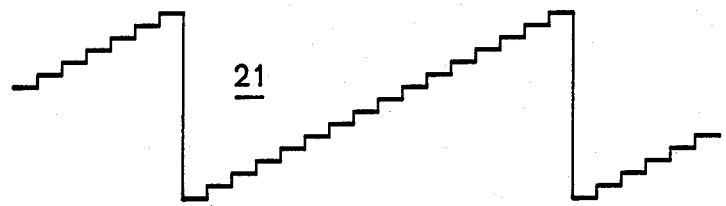
FIG. 2
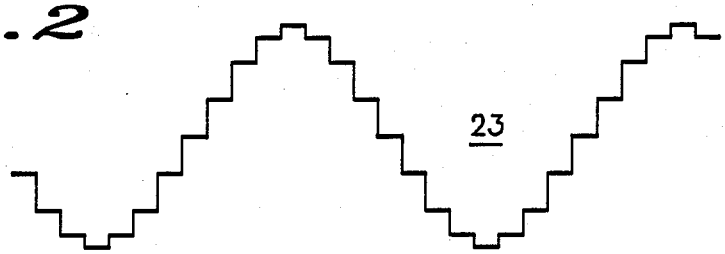
FIG. 3
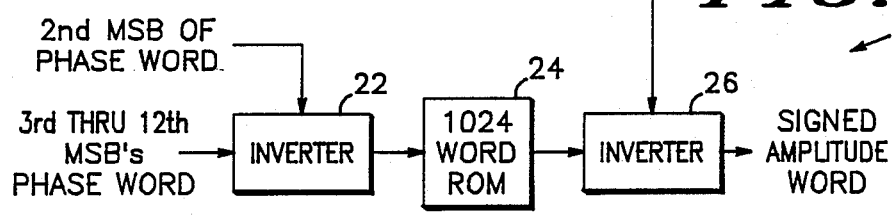
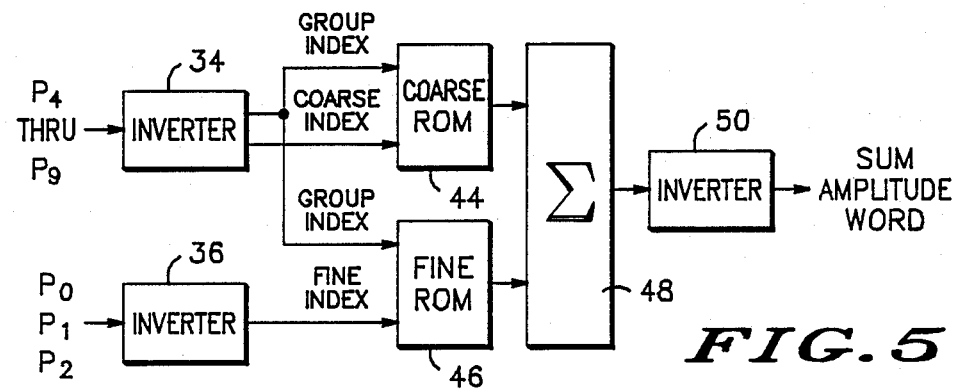
FIG. 5

REDUCED SIZE PHASE-TO-AMPLITUDE CONVERTER IN A NUMERICALLY CONTROLLED OSCILLATOR

BACKGROUND OF THE INVENTION

Conventional frequency synthesizers such as phase-locked loops accomplish the generation of many different frequencies from one or more stable sources by means of an analog circuit or by a combination of analog and digital circuits. In these approaches, a generation of frequencies is performed in the analog or continuous sense by division, phase lock, mixing or some combination of these techniques.

A conventional numerically controlled oscillator (NCO) uses time domain amplitude samples to generate a sinusoidal waveform whose frequency is controlled by a digitial control word in the period of a single clock cycle. An NCO's output frequency can change instantly without the acquisition and lock time delays associated with conventional phase-locked loop synthesizers.

A typical NCO uses a phase accumulator, a phase-to-amplitude converter (PAC), a digital-to-analog converter (DAC), and a bandpass or low pass filter to generate a sinusoidal signal. The purity of the NCO output signal depends in large measure on generating digital amplitude words within the PAC which accurately represent a sampled sine wave.

Most PACs use two or more lookup tables and some associated logic to provide the phase-to-amplitude conversion. The size of the lookup tables may be reduced when certain approximations are made. However, each approximation reduces the PAC size at the expense of amplitude word accuracy. When choosing an NCO design, a tradeoff exists between spectral purity, PAC size and power.

In U.S. Pat. No. 4,486,845, entitled "Numerically Controlled Oscillator Using Quadrant Replication and Function Decomposition," issued Dec. 4, 1984, the size of the PAC is reduced by reducing the amount of data in a lookup table to include fine and coarse values for only the first quadrant of a sine and a cosine wave. The second quadrant sine must be produced from the cosine of the first quadrant and (vice versa) or boundary errors will be produced. From this information and related logic circuity, the remaining quadrants can be calculated. This has reduced the size of the NCO allowing it to fit on one semiconductor chip without affecting amplitude word accuracy. A further reduction in size, however, would make NCO large scale integration in high-speed ECL or gallium arsenide technologies more feasible.

SUMMARY OF THE INVENTION

The major components of this invention are a phase accumulator, a phase-to-amplitude converter (PAC), and a digital-to-analog converter (DAC). On the rising edge of each clock cycle, the pass accumulator generates a new phase word by adding a frequency word to the previous phase word. The PAC transforms the new phase word to an amplitude word which is converted to an analog signal by the DAC before being filtered to reduce noise and sampling harmonics. The NCO output frequency is determined by the frequency word and the clock frequency. The PAC consists of lookup tables and associated logic circuits. In this invention, the memory containing the lookup tables is substantially reduced in size due to the reduced amount of data needed. The data consists of fine and coarse values which have a ½ LSB phase step offset and a −½ amplitude step offset. These offsets permit quadrant replication using one quadrant.

Memory is further reduced by partitioning the PAC into groups of coarse values and fine values. The phase word is partitioned into quadrant, group, coarse and fine indices. The fine values are addressed by the group and fine indices. The less significant bits of the fine index are inverted whenever the most significant bit of the fine index is not set and the fine value addressed is subtracted from the coarse value addressed by the group and coarse indices. This allows for positive and negative fine values which can be added to the coarse values thus reducing the number of coarse values by ½. Positive and negative fine values are discussed in a paper by Joseph Tierney ("A Digital Frequency Synthesizer", IEEE Transactions on Audio and Electroacoustics, Vol. Au-19, No. 1, March 1971, pp. 48–57, page 51 in particular where the sign of the fine value is determined by the MSB of the fine value index. The present invention goes a step further by calculating the sign of the fine value based on the 2nd MSB of the phase word in addition to the MSB of the fine value index to accommodate quadrant replication.

It is an object of the present invention to provide a new and improved numerically controlled oscillator.

It is a further object of the present invention to provide a numerically controlled oscillator that has been reduced in size, weight and power consumption.

These and other objects of this invention will become apparent to those skilled in the art upon consideration of the accompanying specification, claims and drawings.

BRIEF DESCRIPTION OF THE DRAWINGS

FIG. 1 is a simplified block diagram illustrating a conventional numerically controlled oscillator;

FIG. 2 is a digital plot of the phase word vs. the amplitude word;

FIG. 3 is a simplified block diagram of a 12-bit phase-to-amplitude conerter using quadrant replication useful for explaining the present invention;

FIG. 4b is a graph of the coarse indices within the first group of FIG. 4a; and

FIG. 5 is a simplified block diagram illustrating a 12-bit phase-to-amplitude converter of the present invention with addition means and logic means for quadrant replication.

DESCRIPTION OF THE PREFERRED EMBODIMENT

Figure 4A:
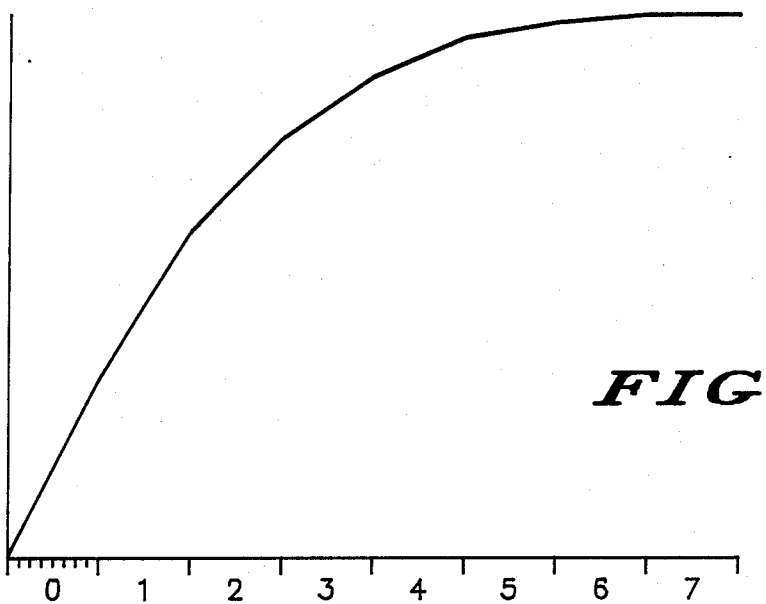
FIG. 4a is a graph showing the group indices of a first quadrant of a sinusoidal wave utilized in the present invention.

FIG. 1 is a simplified block diagram of a conventional numerically controlled oscillator (NCO) 10. The major components of NCO 10 are a phase accumulator 12, a phase-to-amplitude converter (PAC) 14 coupled to phase accumulator 12, and a digital-to-analog converter (DAC) 16 coupled to PAC 14. An NCO uses time domain amplitude samples to generate a sinusoidal waveform whose frequency is controlled by a digital control word and the frequency of a single clock signal. On the rising edge of each clock cycle, the phase accumulator generates a new phase word by adding the frequency word to the previous phase word. The PAC transforms the phase word to an amplitude word which is converted to an analog signal by the DAC before being filtered in a low pass filter 18, to reduce noise and sampling harmonics. The output frequency $F_{NCO}$ is determined by the frequency word and NCO clock rate $F_{CLK}$.

FIG. 2 shows the relationship between the digital phase word waveform 21 and the digital amplitude word waveform 23 when $F_{NCO}$ is 1/16 of $F_{CLK}$. The size of each step in the phase word is the value given by the frequency word. Increasing the frequency word increases the phase word step size which increases the NCO's output frequency without causing any discontinuities in the phase.

In the embodiment of FIG. 1 a 12-bit phase word is output from phase accumulator 12 and input to the PAC 14. The PAC 14 generates a corresponding digital amplitude word approximating the transform $$AW = \beta \sin[(PW + \tfrac{1}{2})\pi/2048] - \tfrac{1}{2} \quad (1)$$

where
AW is the amplitude word $$-\beta - \tfrac{1}{2} \leq AW - \beta - \tfrac{1}{2}$$

PW is the n-bit phase word, and $$0 \leq PW \leq 2^n - 1$$

$\beta$ is a scaling factor given by $\beta = (2^m - 1)/2$
where
m is the number of bits used by the DAC (i.e. m=10 for a 10-bit DAC).

Twelve bits of phase may be transformed using a single 4096 word lookup table stored in ROM or RAM. While conceptually simply, the single lookup table approach is very costly in terms of power and gate count.

Power and gate count can be reduced by nearly 75% by taking advantage of quadrant symmetry using a technique called quadrant replication which uses samples generated by the first quadrant of the sine function to produce samples for the remaining three quadrants. Using this approach, the first quadrant could be stored in a single, 1024-word ROM addressed by the lower 10 bits of the phase word.

FIG. 3 illustrates a simplified 12-bit PAC 20 having one memory and no partitioning of the amplitude word in fine and coarse amplitude words. The two most significant bits (MSB) $P_{11}$ and $P_{10}$ of the phase word determine the quadrant of the sine wave to be defined. The other bits of the phase word ($P_0$–$P_9$) are used to address sample values in the memory. Bits $P_0$–$P_9$ are input into an inverter 22 where they are inverted if $P_{10}=1$. The output from inverter 22 is input into the memory device 24, which in this illustration is a single ROM. Bits $P_0$–$P_9$ of the phase word then address sample values from the ROM. If $P_{10}=1$ as opposed to $P_{10}=0$ then bits $P_0$–$P_9$ are inverted and address the ROM data in decreasing order as the phase word increases. The data addressed by the phase word is an amplitude word. Thus, the address input to data output transformation performed by memory 24 represents a phase-to-amplitude conversion. The output from the ROM is then input to a second inverter 26, along with the MSB of the phase word ($P_{11}$). If $P_{11}=1$ then the amplitude word is inverted.

U.S. Pat. No. 4,486,846, employs quadrant replication. However, since a second quadrant must be produced from the cosine of the first quadrant, extra memory and logic functions are required. In the present invention, a second quadrant amplitude word is produced by complementing the ROMs address whenever the second most significant bit (MSB) $P_{10}$ of the phase word is set by inverter 22. This is possible if the ROM values for the first quadrant are calculated using the phase offsets shown in equation (1). A ½ LSB phase offset is added to the phase word in equation (1) so that the last sample of the first quadrant has the same amplitude as the first sample of the second quadrant thus allowing no errors or discontinuities to occur at the quadrant boundaries.

As shown in FIG. 3, the third and fourth quadrants are formulated by inverting the amplitude word at the ROM's output 26 whenever the MSB ($P_{11}$) of the phase word is set.

It is possible to replicate the third and fourth quadrant from 1st and 2nd quadrant ROM values using only a ones complement rather than a twos complement negation if the ROM values for the first quadrant are calculated using the amplitude offset as shown in equation (1). A ½ LSB amplitude offset is introduced in equation (1) so that the sine change required for the third and fourth quadrants may be executed using a ones complement implementation rather than a more costly and complicated twos complement implementation. This allows for a reduction in the logic circuitry and thus a reduction in the size of the PAC.

If a digital word is represented by the variable x, the ones complement of x may be expressed as ones complement of $x = -(x+1)$. The twos complement of x, which is a negation, may be expressed as twos complement of $x = -(x+1)+1 = -x$. The ones complement operation is accomplished by inverting each bit of x (i.e. 1001111001 to 0110000110). The two complement operation requires an inversion of each bit followed by an addition of one (i.e. 1001111001 to 0110000110+1=0110000111).

Third and fourth quadrant amplitude values of a sine wave equal the negation of first and second quadrant sine wave values. Thus, a twos complement operation could be performed on first and second quadrant data to produce third and fourth quadrant data. This could be accomplished by performing a twos complement operation. If a given phase p, results in an amplitude value x, then the phase p+180° will produce the amplitude word −x. The difference between 1st/2nd and 3rd/4th quadrant will be $x-(-x)=2x$. The DC value of the result will be zero.

The twos complement operation is undesirable because of increased complexity in its implementation when compared to ones complement operations. The twos complement addition may be eliminated by offsetting amplitude data programmed in ROM 24 by $-\frac{1}{2}$ LSB, as shown by equation 1. If an amplitude word corresponds to $p=x-\frac{1}{2}$ then a ones complement of this value will generate the value $-(x-\frac{1}{2}+1)=-x-\frac{1}{2}$. As with twos complement, the difference between two values 180° apart is 2x. Thus, with the offset, the ones complement output result will equal a twos complement output result without the additional steps associated with the twos complement operation. Thus substantially reduces the size of the PAC.

After reducing the size of the memory and related logic circuitry in the PAC through quadrant replication, the memory size can be further reduced by the partitioning of the quadrant.

Each lookup table value can be described by a coarse value plus a fine value offset. A group of sinusoidal samples with adjacent addresses is represented likewise by a single coarse value and a group of fine value offsets where each sample is assigned a unique fine value.

When the coarse value is midway between the first and last samples of a small group consisting of an even number of adjacent samples, each fine value may approximate two samples by being either added to or subtracted from the coarse value. Consequently, only half as many fine values are required when each fine value is both added and subtracted as opposed to just adding fine values to a coarse value.

Since the slope of the sine wave varies gradually, an additional approximation may be made by representing an adjacent set of samples using the same set of fine values but a different coarse value correction. Partitioning the first quadrant of the sine wave into groups where the samples within each group are defined by the group's unique set of fine values and coarse corrections reduces the NCO's memory requirements significantly.

Figure 4B:
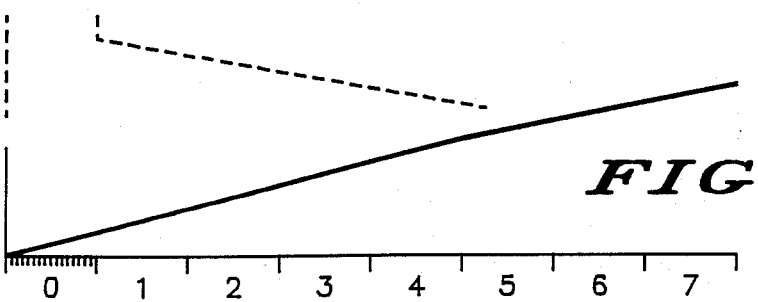
Figure 4C:
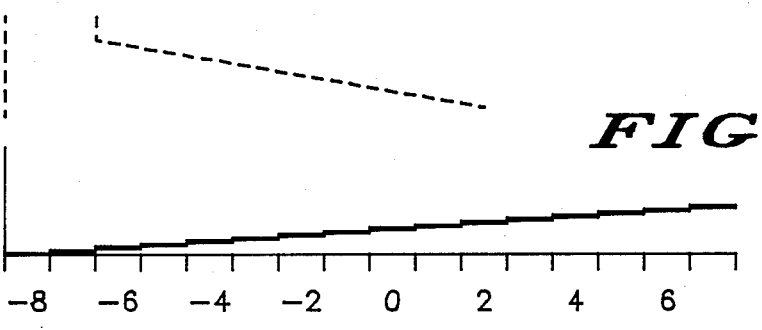
FIG. 4c is a graph of the fine indices within the first coarse value within the first group.

FIG. 4a shows the first quadrant of a sine wave partitioned into eight groups. Each group contains 128 coarse value samples. The 128 samples within any one group are approximated by a unique set of eight coarse values as shown in FIG. 4b and eight fine values, which can each be positive and negative making 16 unique values for each group as shown in FIG. 4c.

FIG. 5 is a simplified block diagram illustrating a PAC as shown in FIG. 3 partitioned into groups, coarse values, and fine values in using two memories. In FIG. 5, coarse and fine amplitude words are stored in a coarse ROM 44 and a fine ROM 46. The first two MSBs ($P_{11}$ and $P_{10}$) of the phase word are used to determine the quadrant. The group index is determined by bits $P_7$ through $P_9$, the coarse index by bits $P_4$ through $P_6$ and the fine index determined by bits $P_0$ through $P_3$. Using this partitioning scheme, in this preferred embodiment only two 64-word memories, 44 and 46, are needed to store the coarse and fine values. These two memories combined, are smaller than using one 1024 word memory.

Since the slope of the sine wave is not constant, paritioning causes small approximation errors. It is important to minimize these errors in order to avoid frequency domain spurs. The PAC amplitude words only approximate the amplitude words given by equation (1) over the first quadrant by idex, coarse and fine values as AW(g,c,f) $CV_{gc}+FV_{gf}$, where $CV_{gc}$ is the coarse value addressed by the group and coarse indices, and $FV_{gf}$ is defined as the fine value addressed by the group and fine indices.

In the disclosed PAC partitioning using positive and negative fine values, the following relationship also exists $$FV_{gf} = -FV_{gf'} \qquad (2)$$

where
$f' = -(f+1)$

The approximation error $\epsilon_{gcf}$ associated with each sample is given by $$\epsilon_{gcf} = AW(g,c,f) - CV_{gc} - FV_{gf}$$

for
$$f \geq 0 \epsilon_{gcf} = AW(g,c,f) - CV_{gc} + FV_{gf'} \text{ for } f<0 \qquad (3)$$

Coarse and fine values are calculated to mininize the maximum error associated with any single sample. The maximum errors related to each coarse value occur with the samples requiring the largest fine offset. The optimum coarse value is the average value of the smallest and largest samples associated with that coarse value. Using the partitioning scheme defined earlier; where 8 fine values are defined per group and the errors are given by equation 3, the optimum coarse values satisfy the equation $$\epsilon_{gc'} = -\epsilon_{gc\text{-}8} \qquad (4)$$

or
$$AW(g,c,7) - CV_{gc} - FV_{g7} = -\{AW(g,c,-8) - CV_{gc} + FV_{g7}\}$$

so $$CV_{gc} = (AW(g,c,7) + AW(g,c,-8))/2 \quad (5)$$
$$CV_{gc} = \{\beta\sin[(PW_{gc7} + \tfrac{1}{2})\pi/2048] - \tfrac{1}{2} +$$
$$\beta\sin[(PW_{gc-8} + \tfrac{1}{2})\pi/2048] - \tfrac{1}{2}\}/2$$
$$CV_{gc} = \beta\{\sin[PW_{gc7} + \tfrac{1}{2})\pi/2048] +$$
$$\sin[(PW_{gc-8} + \tfrac{1}{2})\pi/2048] - 1\}/2$$

for $g = 0, 1, 2, \ldots,$ or 7, and
$c = 0, 1, 2, \ldots,$ or 7.

The errors within each group are greatest at the group boundaries. The fine values of each group must be optimized to minimize these errors. Using a partitioning scheme having 8 coarse values per group and the errors given by Eq. 3, the optimum fine values of each group are given by $$\epsilon_{g0f} = \epsilon_{g7f} \quad (6)$$

or $$W(g,0,f) - CV_{g0} + FV_{gf} = -\{AW(g,7,f) - CV_{g7} - FV_{gf}\}$$

Applying Eq. 2 and Eq. 4 reduces this equation to $$FV_{gf} = (AW(g,0,f) - CV_{g0} + AW(g,7,f) - CV_{g7})/2$$
$$FV_{gf} = [AW(g,0,f) - \{AW(g,0,-8) + AW(g,0,7)\}/2 +$$
$$AW(g,7,f) - \{AW(g,7,-8) + AW(g,7,7)\}/2]/2$$
$$FV_{gf} = \beta/2 \{\sin[(PW_{g0f} + \tfrac{1}{2})\pi/2048] -$$
$$\tfrac{1}{2}\sin[(PW_{g0-8} + \tfrac{1}{2})\pi/2048] -$$
$$\tfrac{1}{2}\sin[(PW_{g07} + \tfrac{1}{2})\pi/2048] +$$
$$\sin[(PW_{g7f} + \tfrac{1}{2})\pi/2048] -$$
$$\tfrac{1}{2}\sin[(PW_{g7-8} + \tfrac{1}{2})\pi/2048] -$$
$$\tfrac{1}{2}\sin[(PW_{g77} + \tfrac{1}{2})\pi/2048]\}$$

for $g = 0, 1, 2, \ldots,$ or 7, and
$f = 0, 1, 2, \ldots,$ or 7.

The absolute worst approximation errors for a particular partitioning scheme occur at 90° and 270° where the rate of change in the slope of the sine function is the greatest. The maximum approximation error $\epsilon_{777}$ may be calculated using Eq. 3, 5 and 7.

FIG. 5 shows the operation of the PAC along with the manipulation of the output for the first quadrant to determine the second, third, and fourth quadrants. Bits $P_4$ through $P_9$ of the 12-bit phase word address coarse ROM 44. In an inverter 34, if bit $P_{10}=1$ then bits $P_4$ through $P_9$ are inverted and the values in coarse ROM 44 are addressed in reverse order for quadrants 2 and 4. Bits $P_0$ through $P_2$ are entered into inverter 36 where they are inverted when the fine offset is negative. The fine offset is negative when bit $P_3=0$. These bits along with the group index then address fine ROM 46 and output the values. The coarse and fine values are then input into adder 48 where the coarse value is added to a fine value if $P_3+P_{10}=0$; otherwise, the coarse value is added to the negative of the fine value. The sum amplitude word is then input into inverter logic 50 where the sum amplitude word within quadrants 3 and 4 is inverted if bit $P_{11}=1$.

Thus, with the addition and subtraction of fine values from the coarse values, the number of coarse values is cut in half as opposed to the number needed if just positive fine values were added to the coarse values. The amount of data stored in memory is substantially reduced allowing for smaller memory. The smaller memory reduces the size and cost of the PAC. The use of ones complement instead of twos complement for determining amplitude values for third and fourth quadrant outputs, reduces the size of the logic circuitry in the PAC.

Having thus described the invention, it will be apparent to those skilled in the art that various modifications can be made within the spirit and scope of the present invention. For example, while ROMs were used as the memory in the PAC, any data storing device could be used. Also, while in this embodiment, quadrants were partitioned into eight groups each having eight coarse values which in turn each had eight fine values, it should be understood by those skilled in the art that different partitioning schemes could be used.

I claim:

1. In a numerically controlled oscillator utilizing quadrant replication and including a phase-to-amplitude converter, a method of performing a phase-to-amplitude conversion comprising the steps of:
    providing a memory including a fine memory partition and a coarse memory partition, said memory for storing fine and coarse amplitude words respectively, in the phase-to-amplitude converter;
    inputting a phase word into the phase-to-amplitude converter;
    addressing said fine memory partition and said coarse memory partition with said phase word, and outputting a fine amplitude word and a coarse amplitude word of a sample of a quadrant of a sinusoidal wave;
    adding one of a positive and a negative fine amplitude word to said coarse amplitude word to produce a sum amplitude word that approximates the equation:

$$AW = \beta\sin\,[(PW+\tfrac{1}{2})\pi/2^{(n-1)}] - \tfrac{1}{2}$$

where
    AW is sum amplitude word
    PW is the phase word, and
    n is the number of bits used to describe PW
    $\beta$ is a scaling factor
given by $$\beta = (2^{m-1})/2$$

where
    m is the number of bits used by a digital to analog converter (DAC);
    determining a quadrant number from particular bits of said phase word;
    ones complementing said sum amplitude word of said adding step via logic means; and
    iterating said steps of addressing and adding for second, third and fourth quadrant numbers and said complemented sum amplitude word to determine sum amplitude words which represent said second, third and fourth quadrants of a sinusoidal wave.

2. A numerically controlled oscillator having a phase-to-amplitude converter comprising:

a phase accumulator having an input and an output;

a phase-to-amplitude converter with an input and an output, said phase-to-amplitude converter input being coupled to said output of said phase accumulator and said phase-to-amplitude converter including:

a memory having an address input and an output, said memory having stored therein a plurality of fine and coarse amplitude words defining a first quadrant of a sinusoidal wave, said fine and coarse amplitude words approximating the equation:

$$AW = \beta \sin[(PW + \tfrac{1}{2})\pi/2^{(n-1)}] - \tfrac{1}{2}$$

where
AW is sum amplitude word
PW is the phase word, and
n is the number of bits used to describe PW
$\beta$ is a scaling factor
given by $$\beta = (2^{m-1})/2$$

where
m is the number of bits used by a digital to analog convertor (DAC)
logic means coupled to said memory, said logic means for determining a quadrant number from particular bits of said phase word;
said logic means further operating to ones complement said sum amplitude word;
said memory further operating in response to said quadrant number and to said complemented sum of amplitude word to produce sum amplitude words which represent second, third and fourth quadrants of a sinusoidal wave;
said digital-to-analog converter with an input coupled to said output of said phase-to-amplitude converter and an output; and
a low pass filter coupled to said output of said digital-to-analog converter.

3. A numerically controlled oscillator as claimed in claim 2 wherein said memory is partitioned to provide coarse and fine amplitude words.

4. A numerically controlled oscillator as claimed in claim 2 having a memory comprising a first ROM for fine amplitude words and a second ROM for coarse amplitude words and an adding means for adding one of a positive and a negative fine amplitude word to said coarse amplitude word.

5. A numerically controlled oscillator having a phase-to-amplitude converter comprising:

a phase accumulator having an input and an output;

a phase-to-amplitude converter with an input and an output, said phase-to-amplitude converter input being coupled to said output of said phase accumulator, said phase-to-amplitude converter including:

a memory having an address input and an output, said memory having stored therein a plurality of fine and coarse amplitude words defining a particular member quadrant of a sinusoidal wave;

adding means for adding one of a positive and a negative fine amplitude word to said coarse amplitude word sum approximating the equation:

$$AW = \beta \sin[(PW + \tfrac{1}{2})\pi/2^{(n-1)}] - \tfrac{1}{2}$$

where
AW is sum amplitude word
PW is the phase word, and
n is the number of bits used to describe PW
$\beta$ is a scaling factor
given by $$\beta = (2^{m-1})/2$$

where
m is the number of bits used by a digital to analog converter (DAC);
logic means coupled to said adding means, said logic means for determining a quadrant number from particular bits of said phase word;
said logic means further operating to ones complement said amplitude word sum;
said memory further operating in response to second, third and fourth equadrant numbers and to said complement amplitude word sum to produce new fine and coarse amplitude words;
said adding means further operating in response to said new fine and coarse amplitude words and to said complement amplitude word sum to produce amplitude word sums which represent said second, third and fourth quadrants of a sinusoidal wave;
said digital-to-analog converter with an input coupled to said output of said phase-to-amplitude converter and an output; and
a low filter coupled to said output of said digital-to-analog converter.

6. A numerically controlled oscillator as claimed in claim 5 wherein the fine and coarse memory means are Read-only-Memory.

* * * * *

UNITED STATES PATENT AND TRADEMARK OFFICE
CERTIFICATE OF CORRECTION

PATENT NO. : 4,855,946

DATED : August 8, 1989

INVENTOR(S) : Paul W. Ruben et al.

It is certified that error appears in the above-identified patent and that said Letters Patent is hereby corrected as shown below:

In column 10, claim 5, line 13, delete the word "member" and substitute the word --number--.

Signed and Sealed this

Third Day of April, 1990

Attest:

HARRY F. MANBECK, JR.

*Attesting Officer*  *Commissioner of Patents and Trademarks*